United States Patent
Zhang et al.

(10) Patent No.: US 12,501,368 B2
(45) Date of Patent: *Dec. 16, 2025

(54) ADAPTIVE MOBILE NETWORK OPERATION

(71) Applicant: T-Mobile USA, Inc., Bellevue, WA (US)

(72) Inventors: Hongliang Zhang, Samammish, WA (US); Dennis Jarret Guill, Jr., Richardson, TX (US); Robert Frangooles, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,280

(22) Filed: Jan. 22, 2024

(65) Prior Publication Data

US 2025/0150982 A1 May 8, 2025

Related U.S. Application Data

(63) Continuation of application No. 16/877,221, filed on May 18, 2020, now Pat. No. 11,882,526.

(51) Int. Cl.
| | |
|---|---|
| *H04W 16/14* | (2009.01) |
| *H04L 5/00* | (2006.01) |
| *H04W 24/02* | (2009.01) |
| *H04W 52/24* | (2009.01) |
| *H04W 72/541* | (2023.01) |

(52) U.S. Cl.
CPC ......... *H04W 52/243* (2013.01); *H04L 5/0098* (2013.01); *H04W 16/14* (2013.01); *H04W 24/02* (2013.01); *H04W 72/541* (2023.01)

(58) Field of Classification Search
CPC ... H04W 24/02; H04W 16/14; H04W 72/541; H04W 52/243; H04L 5/0098
See application file for complete search history.

(56) References Cited

U.S. PATENT DOCUMENTS

| | | | |
|---|---|---|---|
| 2013/0210434 A1* | 8/2013 | Dimou | H04W 36/0079 455/452.2 |
| 2014/0106759 A1 | 4/2014 | Geng et al. | |

(Continued)

OTHER PUBLICATIONS

Office Action for U.S. Appl. No. 16/877,221, mailed on Nov. 29, 2022, Zhang, "Adaptive Mobile Network Operation ", 15 pages.

(Continued)

*Primary Examiner* — Dai Phuong
(74) *Attorney, Agent, or Firm* — Lee & Hayes, P.C.

(57) ABSTRACT

An adaptive network operation (ANO) server configured to reduce unnecessary radio operation during lower and/or non-traffic times is described herein. The ANO server may receive raw data associated with one or more nodes within a telecommunications network. Responsive to receiving the raw data, the ANO server may determine, based at least in part on the raw data, a traffic level associated with the one or more nodes and/or a traffic capacity associated with the one or more nodes. The ANO server may determine one or more frequency bands and/or channels to activate and/or deactivate and may generate configuration settings to send to the one or more nodes.

20 Claims, 6 Drawing Sheets

(56) References Cited

U.S. PATENT DOCUMENTS

| | | | |
|---|---|---|---|
| 2014/0293867 A1* | 10/2014 | Horiuchi | H04W 72/0453 370/315 |
| 2015/0103779 A1 | 4/2015 | Ma | |
| 2015/0139015 A1 | 5/2015 | Kadous et al. | |
| 2015/0381291 A1 | 12/2015 | Mahajan et al. | |
| 2016/0048688 A1 | 2/2016 | Flynn et al. | |
| 2016/0050587 A1 | 2/2016 | Lam et al. | |
| 2016/0050676 A1* | 2/2016 | Sinnaduray | H04L 5/00 370/329 |
| 2016/0066202 A1 | 3/2016 | Dayanandan et al. | |
| 2016/0112881 A1 | 4/2016 | Duan et al. | |
| 2016/0191115 A1* | 6/2016 | Sano | H04J 11/0043 375/144 |
| 2017/0034795 A1* | 2/2017 | Madan | H04W 52/243 |
| 2017/0170888 A1 | 6/2017 | Yrjola et al. | |
| 2017/0215191 A1 | 7/2017 | Martin | |
| 2019/0281608 A1 | 9/2019 | Huang et al. | |
| 2020/0092797 A1 | 3/2020 | Gustafson et al. | |
| 2020/0154442 A1 | 5/2020 | Zhou | |
| 2021/0105633 A1 | 4/2021 | Vaidya et al. | |
| 2021/0360539 A1 | 11/2021 | Zhang et al. | |

OTHER PUBLICATIONS

Office Action for U.S. Appl. No. 16/877,221, mailed on Feb. 22, 2022, Zhang, "Adaptive Mobile Network Operation ", 15 Pages.
Office Action for U.S. Appl. No. 16/877,221, mailed on Mar. 27, 2023, Hongliang Zhang, "Adaptive Mobile Network Operation", 20 pages.
Office Action for U.S. Appl. No. 16/877,221, mailed on Aug. 31, 2021, Zhang, "Adaptive Mobile Network Operation ", 13 pages.

* cited by examiner

ADAPTIVE MOBILE NETWORK OPERATION

RELATED APPLICATIONS

This application is a continuation of and claims priority to U.S. patent application Ser. No. 16/877,221, filed May 18, 2020, titled "ADAPTIVE MOBILE NETWORK OPERATION," the entirety of which is incorporated herein by reference.

BACKGROUND

Mobile traffic may be distributed unevenly within a mobile network and may vary based on a time of day and location. For example, mobile users may concentrate in different locations during working hours, evening, and during the weekend, while light mobile traffic may be experienced during night in most places. Most nodes (e.g., base stations) of a mobile network are designed for operating at peak mobile traffic regardless of mobile traffic variations. In some cases, nodes may have radios operating over all frequency bands at full power. Excessive radio operation during lower or non-traffic time may cause radio frequency interference and/or may waste resources (e.g., power).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
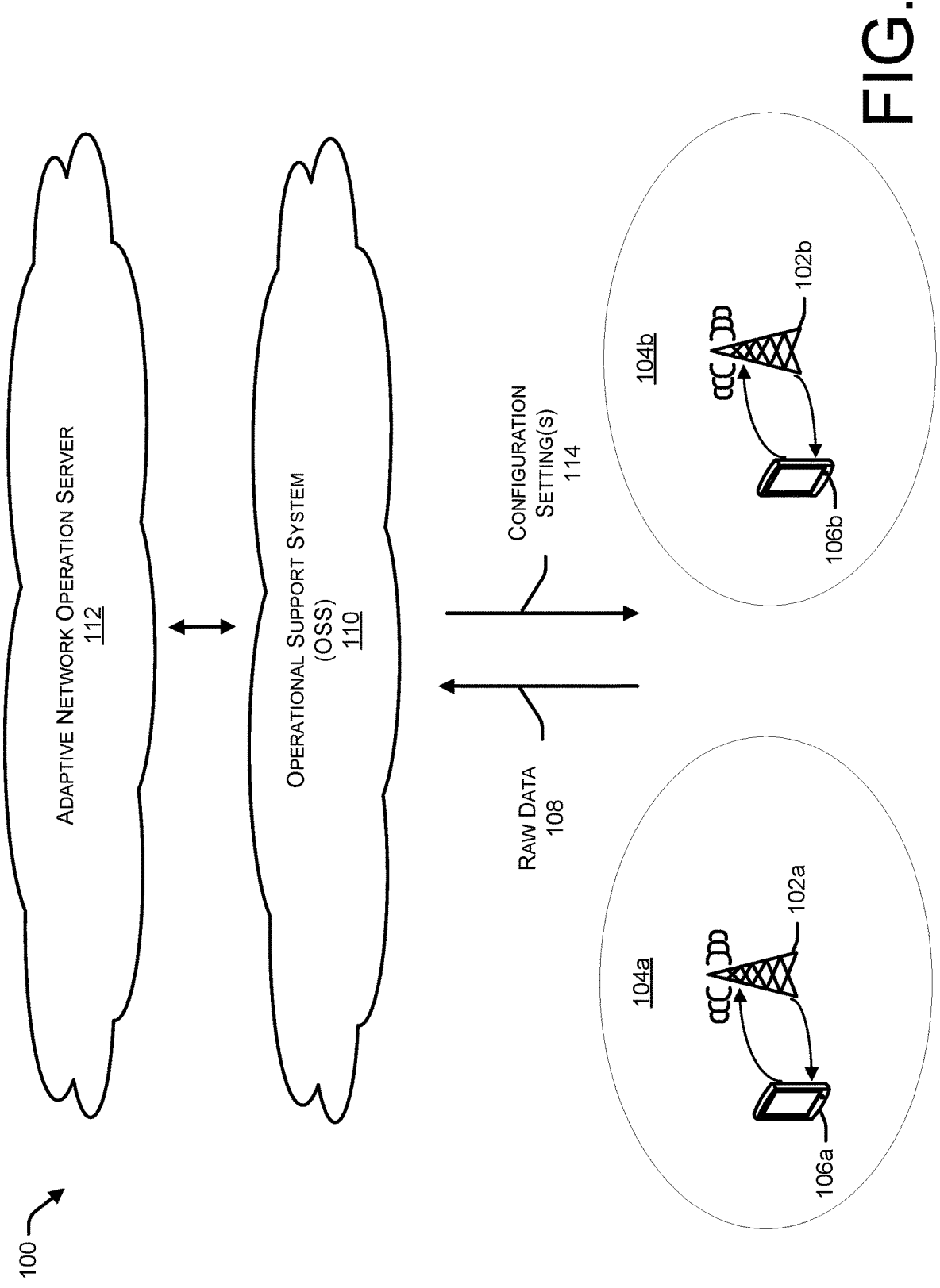
FIG. 1 illustrates an example overview of a first telecommunications network configured to activate and/or deactivate frequency bands and/or channels based on traffic data.

Described herein are systems and methods for optimizing nodes within a telecommunication network to reduce unnecessary radio operation during lower and/or non-traffic times. Telecommunications networks and their associated nodes are historically designed to operate over a maximum number of frequencies at full power in order to ensure a quality of service standard for their associated customers. Excessive radio operation during lower or non-traffic time causes unnecessary waste (e.g., increased operational costs) and harmful interference between nodes. An adaptive network operation server may determine which frequency bands and/or channels being used by a node can be turned off, or reduced in power, such that there is a reduced interference impact on the surrounding nodes and/or cells and that the coverage provided to users operating on the network is not detrimentally affected.

In one example, a node and/or cell within a telecommunication network may operate using multiple frequency bands and/or channels. For example, a node and/or cell providing service to an area including a school may encounter peak traffic times during school hours (e.g., 8:00 A.M. to 3:00 P.M.) and may encounter lower traffic, or no traffic, at night time. Similarly, a node and/or cell providing service to a shopping center may experience peak traffic times during operating hours of the shopping center, as opposed to when the shopping center is close. An operational support system (OSS) may periodically determine (e.g., check and/or query) raw data associated with the node and/or cell, such as how many user devices (e.g., user equipment (UE)) are operating on and/or are attached to a particular frequency band and/or channel associated with the node and/or cell. The OSS may store the raw data in a data storage device and/or provide the raw data to an adaptive network operation (ANO) server. The ANO server may access the raw data and determine a traffic level associated with the node and/or cell, such as, by determining an average number of active UEs over a time period, an average number of attached UEs over a time period, an average number of allocated Physical Resource Blocks (PRBs) per UE over a time period, a traffic level indication per frequency band, a traffic level indication per channel, and/or a traffic level indication per site (e.g., at the node and/or cell). In some cases, the ANO server may determine if the traffic level associated with a frequency band and/or channel is less than, equal to, or greater than a predetermined threshold for deactivating the frequency band and/or channel.

Similarly, the ANO server may determine if the traffic level associated with a frequency band and/or channel is less than, equal to, or greater than a predetermined threshold for activating a previously deactivated frequency band and/or channel, if available. In some cases, the predetermined thresholds may be determined by a determined traffic handling capacity associated with at least one of the frequency band, the channel, or the site. For example, if the traffic level associated with a frequency band and/or channel is less than the determined traffic handling capacity of the frequency band and/or channel, then the ANO server may determine that the frequency band and/or channel can be deactivated and/or reduced in power. Similarly, if the traffic level associated with a frequency band and/or channel is greater than the determined traffic handling capacity of the frequency band and/or channel, and/or is near or close to the determined traffic handling capacity of the frequency band and/or channel, then the ANO server may determine that a previously deactivated frequency band and/or channel can be activated and/or increased in power.

In some cases, if no frequency bands and/or channels associated with the node/cell or site is available to be activated and/or increased in power, then the node/cell or site may experience some traffic congestion when traffic level is continuously increasing. Similarly, in order to ensure a quality of service standard or other network services (e.g., E911, or serving special mobile devices), the ANO server may determine a minimum number of frequencies and/or a special band/or frequency associated with the node/cell or site that are in operation as default bands or channels without being deactivated, even during lower and/or non-traffic time.

The ANO server may generate a list of candidate frequency bands and/or channels to deactivate and/or activate based on the determined traffic levels associated with the frequency bands and/or channels and the determined traffic handling capacities associated with the frequency bands and/or channels. Once the list of candidate frequency bands and/or channels is generated, the ANO server may perform an interference impact analysis to determine an interference impact associated with each frequency band and/or channel relative to another node and/or cell.

For example, the ANO server may access interreference tables associated with each frequency band and/or channel and may rank the list of candidate frequency bands and/or channels based on the information stored in the interreference table. The ANO server may rank the list of candidate frequency bands and/or channels based on minimizing the interference within the telecommunication network. For example, a first frequency band and a second frequency band may both be determined to be operating with more traffic handling capacity than their respective associated traffic level, and thus, be candidates to be deactivated and/or reduced in power.

The ANO server may access a first interreference table associated with the first frequency band to determine a first interference impact associated with the first frequency band and the ANO server may access a second interreference table associated with the second frequency band to determine a second interference impact associated with the second frequency band. The ANO server may compare the first interference impact associated with the first frequency band to the second interference impact associated with the second frequency band to determine which frequency band should be deactivated in order to reduce the amount of interference within the telecommunications network.

In other cases, a first frequency band and a second frequency band, which may have both been deactivated previously during lower and/or non-traffic time, may both be determined to be candidates to be activated and/or increased in power based on a traffic level being greater than the determined traffic handling capacity of an operating frequency band and/or channel. The ANO server may access a first interreference table associated with the first frequency band to determine a first interference impact associated with the first frequency band and the ANO server may access a second interreference table associated with the second frequency band to determine a second interference impact associated with the second frequency band. The ANO server may compare the first interference impact associated with the first frequency band to the second interference impact associated with the second frequency band to determine which frequency band should be activated in order to reduce and/or otherwise minimize the amount of interference within the telecommunications network. Once the ANO server identifies the frequency bands and/or channels to activate and/or deactivate, the ANO server may send a transmission to the OSS and/or a database associated with the OSS including re-configuration settings for the respective node and/or cell.

Overview

FIG. 1 illustrates an example overview of a first telecommunications network 100 configured to optimize nodes in order to reduce radio operation during lower and/or non-traffic times. As illustrated in FIG. 1, a node 102a within a cell 104a may be connected to multiple UEs, such as UE 106a located within the cell 104a and a node 102b within a cell 104b may be connected to multiple UEs, such as UE 106b located within the cell 104b. Although only nodes 102a and 102b and cells 104a and 104b are illustrated in FIG. 1, it is to be understood that the telecommunications network 100 may include any number of nodes and/or cells as well as any number of UEs.

In one example, the nodes 102a and 102b within the telecommunications network 100 may operate using multiple frequency bands and/or channels when providing services to the UEs 106a and 106b. The multiple frequency bands and/or channels may include, but are not limited to: (a) Licensed frequency bands or channels such as 600 MHz bands, 700 MHz bands, cellular bands (800/900 MHZ), Personal Communication Services (PCS) bands (1800/1900 MHZ), Advanced Wireless Services (AWS) bands (1.7 GHZ/2.1 GHZ), Wireless Communication Services (WCS) bands (2.3 GHZ), Multichannel Multipoint Distribution Services (MMDS) bands (2.5-2.7 GHZ), the 4.9 GHz band for broadband public safety, Millimeter wave (mmWave) bands (24-39 GHz); (b) Unlicensed frequency bands such as Industrial Scientific and Medical (ISM) frequency bands and Unlicensed National Information Infrastructure (UNII) frequency bands which are well known and can be shared by any number of devices (these unlicensed bands typically include frequencies such as 900 MHz, 2.4 GHz, 5.0 GHz and 5.8 GHz, which are commonly used for cordless telephones, wireless local area networks (WLANs) and Bluetooth devices); and (c) Semi-licensed frequency bands such as the Citizens Broadband Radio Service (CBRS) bands (3.5GH, 3550-3700 MHZ). Each band may have one or more channels which may/may not be consecutively allocated next to each other over a given band. The channel may normally have a bandwidth of 5 MHz, 10 MHz, 15 MHz, and 20 MHz, depending on license. In the mmWave 5G system, the channel bandwidth may be extended to 50 MHz, 100 MHz, 200 MHz, and 400 MHz. In some cases, FCC may open C-band spectrum for cellular networks. Licensees to a licensed frequency band usually have an exclusive right to provide services with the band in a specified geographic area, for a defined term and within specified times. The license is exclusive in the sense that no other service providers are typically allowed to provide services in the same band, in the same area and at the same time. Other licensed bands contemplated include, but are not limited to, a licensed band identified as allocated for WiMax (WiMAX is defined as Worldwide Interoperability for Microwave Access).

The nodes 102a and 102b may be configured to periodically (e.g., every 15 minutes, 5 minutes, 1 minute, etc.) send raw data 108 associated with the cells 104a and 104b to an operational support system (OSS) 110. The raw data 108 may include real traffic information and/or stats collected via various counters embodied in nodes 102a and 102b associated with the cells 104a and 104b, such as how many UEs (e.g., UEs 106a and 106b) are operating on a particular frequency band and/or channel associated with the nodes 102a and 102b, how many UEs are attached to a particular frequency band and/or channel associated with the nodes 102a and 102b, a number of allocated Physical Resource Blocks (PRBs) per UE, and/or a total data volume associated with the nodes 102a and 102b.

The OSS 110 may store the raw data 108 in a data storage device and/or provide the raw data to an adaptive network operation (ANO) server 112. The ANO server 112 may access the raw data 108 and determine a traffic level associated with the nodes 102a and 102b, such as, by determining an average number of active UEs over a time period, an average number of attached UEs over a time period, an average number of allocated PRBs per UE over a time period, a traffic level indication per frequency band, a traffic level indication per channel, and/or a traffic level indication per site (e.g., at the nodes 102*a* and 102*b* and/or the cells 104*a* and 104*b*). In some cases, the time period may be a peak time period, such as during the middle of the day at a school, shopping center, business center, etc. In other cases, the time period may be a non-peak time period, such as at night time.

In some cases, the ANO server 112 may determine the traffic level via a traffic level component stored in a memory of the ANO server 112. In some cases, the ANO server 112 may determine if the traffic level associated with a frequency band and/or channel is less than, equal to, or greater than a predetermined threshold for deactivating the frequency band and/or channel. Similarly, the ANO server 112 may determine if the traffic level associated with a frequency band and/or channel is less than, equal to, or greater than a predetermined threshold for activating a previously deactivated frequency band and/or channel, if available. In some cases, the predetermined thresholds may be determined by a determined traffic handling capacity associated with at least one of the frequency band, the channel, or the site (e.g., the nodes 102*a* and 102*b* and/or the cells 104*a* and 104*b*). In some cases, the ANO server 112 may determine the traffic handling capacity via a traffic capacity component stored in a memory of the ANO server 112. For example, if the traffic level associated with a frequency band and/or channel is less than the determined traffic handling capacity of the frequency band and/or channel, then the ANO server 112 may determine that the frequency band and/or channel can be deactivated and/or reduced in power. Similarly, if the traffic level associated with a frequency band and/or channel is within a threshold amount of the determined traffic handling capacity of the frequency band and/or channel, then the ANO server 112 may determine that a previously deactivated frequency band and/or channel can be activated and/or increased in power.

The ANO server 112 may generate a list of candidate frequency bands and/or channels to deactivate and/or activate based on the determined traffic levels associated with the frequency bands and/or channels and the determined traffic handling capacities associated with the frequency bands and/or channels. Once the list of candidate frequency bands and/or channels is generated, the ANO server 112 may perform an interference impact analysis to determine an interference impact associated with each frequency band and/or channel relative to another node and/or cell. In some cases, the ANO server 112 may determine an interference level via an interference component stored in a memory of the ANO server 112. For example, the ANO server 112 may access interreference tables associated with each frequency band and/or channel and may rank the list of candidate frequency bands and/or channels based on the information stored in the interreference table.

The ANO server 112 may rank the list of candidate frequency bands and/or channels based on minimizing the interference within the telecommunication network. For example, a first frequency band and a second frequency band being used by one of the nodes 102*a* or 102*b* may both be determined to be operating with more traffic handling capacity than their respective associated traffic level, and thus, be candidates to be deactivated and/or reduced in power. The ANO server 112 may access a first interreference table associated with the first frequency band to determine a first interference impact associated with the first frequency band and the ANO server 112 may access a second interreference table associated with the second frequency band to determine a second interference impact associated with the second frequency band. The ANO server 112 may compare the first interference impact associated with the first frequency band to the second interference impact associated with the second frequency band to determine which frequency band should be deactivated in order to reduce the amount of interference within the telecommunications network 100.

In other cases, a first frequency band and a second frequency band associated with one of the nodes 102*a* or 102*b*, which may have both been deactivated previously during lower and/or non-traffic time, may both be determined to be candidates to be activated and/or increased in power based on a traffic level being greater than the determined traffic handling capacity of an operating frequency band and/or channel. The ANO server 112 may access a first interreference table associated with the first frequency band to determine a first interference impact associated with the first frequency band and the ANO server 112 may access a second interreference table associated with the second frequency band to determine a second interference impact associated with the second frequency band. The ANO server 112 may compare the first interference impact associated with the first frequency band to the second interference impact associated with the second frequency band to determine which frequency band should be activated in order to reduce and/or otherwise minimize the amount of interference within the telecommunications network 100.

Once the ANO server 112 identifies the frequency bands and/or channels to activate and/or deactivate, the ANO server 112 may send a transmission to the OSS 110 and/or a database associated with the OSS 110 including configuration settings 114 for re-configuring operational settings associated the respective node 102*a* and/or 102*b* and/or the cell 104*a* and/or 104*b*. In some cases, the configuration setting 114 may be sent directly from the ANO server 112 to the nodes 102*a* and 102*b*. In some cases, the OSS 110 may access a database to retrieve the configuration settings 114 and send the configuration settings 114 to the nodes 102*a* and 102*b*. The configuration settings 114 may cause the nodes 102*a* and 102*b* to activate and/or deactivate (or reduce power to) a single frequency band and/or channel or multiple frequency bands and/or channels.

In some cases, the ANO server 112 may provide an indication to the UEs 106 indicating that at least one of the nodes 102*a* and/or 102*b* are operating in a reduced power mode. For example, carrier-aggregation across frequency bands may not be available when some frequency bands are deactivated due to low traffic. If a user of UE 106 is performing a speed test of the attached network when one or more frequency bands are deactivated, the speed test may indicate a less than expected network performance (because carrier-aggregation is unavailable), even though there is adequate bandwidth for the UE 106 to operate satisfactorily. In this case, the ANO server 112 may cause the UE 106 to display an icon (e.g., via SIB message) indicating that the UE 106 is attached to a node and/or cell that is operating in a power saving mode. In other cases, the ANO server 112 may send a text message to the UE 106 (or any other data or indication) in response to determining that the UE 106 is performing a speed test. The text message may indicate that the UE 106 is attached to a node and/or cell that is operating in a power saving mode. In some cases, the ANO server 112 may communicate with the UE 106 via an application programming interface (API) component in order to inform the user that the UE 106 is attached to a node and/or cell that is operating in a power saving mode. In some cases, the ANO server 112 may access a call detail record (CDR) to determine that a particular UE has performed a speed test and/or indicate the power status of a node (e.g., base station) with which the UE was attached under the speed test.

In various implementations, cells 104a and 104b may be one of a number of access networks of a telecommunications service provider. The telecommunications service provider may operate the telecommunications network 100 that includes access networks, such as cells 104a and 104b, an OSS, such as OSS 110, and an ANO server, such as ANO server 112. The telecommunications service provider may have licenses to bands of radio frequency spectrum and the cells 104a and 104b, via the nodes 102a and 102b, may provide wireless coverage via different parts of the licensed frequency bands. The coverage provided by each node 102a and 102b may vary based on the technology of that node. For example, a Fourth Generation (4G) node may provide access via one set of frequency bands and a Fifth Generation (5G) node may provide access via a different or overlapping set of frequency bands.

Nodes of the telecommunications network, such as Nodes 102a and 102b, may utilize any Third Generation Partnership Project (3GPP) Standard Third Generation (3G), 4G, 5G, etc. technology or other 3G, 4G, 5G, etc. technology. Alternatively or additionally, example nodes may utilize unlicensed wireless networks, such as WiFi® or WiMax® networks, and/or wired access networks.

As illustrated in FIG. 1, the nodes 102a and 102b may include a cell tower; one or more base station units coupled to the cell tower, offering connectivity to respective cells 104a and 104b, and using one or more technology types; one or more power sources; and mechanisms for connecting the base station unit(s) to a core network. For example, the nodes 102a and 102b may include an eNode B (eNB) base station for supporting an LTE connection, a gNode B (gNB) base station for supporting a NR connection, or both. The eNB and gNB may be implemented in a single computing device or through multiple computing devices and may represent an ENDC (E-UTRAN (Evolved UMTS (Universal Mobile Telecommunications Service) Terrestrial Radio Access Network) New Radio-Dual Connectivity) solution. The ENDC solution enables the UEs 106 to connect to the eNB through an LTE connection, with the eNB serving as a master node, and to the gNB through a NR connection, with the gNB serving as a secondary node. ENDC solutions are specified in greater detail by 3GPP standards.

Nodes 102a and 102b may also include a scheduler to allocate time slots for frequency bands, as well as downlink buffers, a configuration component, and an internetwork component.

In some implementations, cell 104a and 104b may correspond to a single geographic area in which the nodes 102a and 102b provide coverage. In other implementations, cells 104a and 104b may correspond to multiple, overlapping geographic area in which multiple nodes provide coverage.

UEs 106, including UE 106a and UE 106b, may be any sort of wireless communication device, such as a cellular handset, a tablet computer, a personal computer, a desktop computing device, a media player, etc. Each UE 106 may include one or more radios for wireless communication and/or wired port(s), may include both input and output components, and may have a Subscriber Identity Module (SIM) or other technology that securely stores identity information for the UE 106. Further, each UE 106 may include a radio protocol stack, applications, and location sensors.

In various implementations, the OSS 110 monitors, controls, analyzes, and/or manages services in the telecommunications network 100. The OSS 110 may validate a configuration of the nodes 102a and 102b to be deployed on the telecommunications network 100. One method of validating the configuration is comparing the configuration file against a known model to determine whether the parameters and values fall within acceptable tolerances. The OSS 110 may be implemented as software in a server computer system. The OSS 110 may also be implemented as software in other types of processing hardware known to one of ordinary skill in the art. The OSS 110 may use the configuration, alone or in combination with one or more configuration models, to build the site relating to the nodes 102a and 102b to be employed in the telecommunications network 100.

Figure 2:
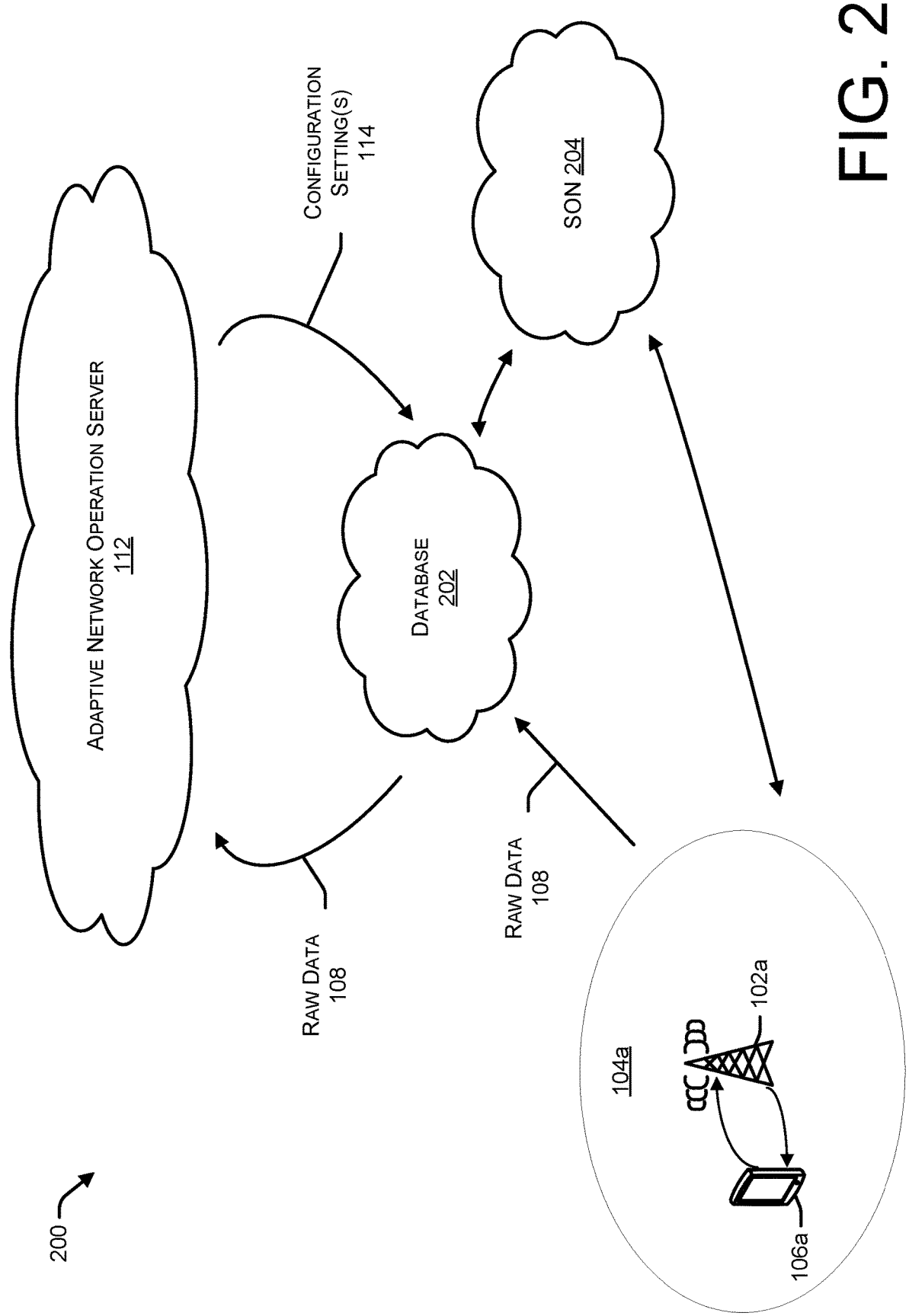
FIG. 2 illustrates an example overview of a second telecommunications network configured to activate and/or deactivate frequency bands and/or channels based on traffic data.

FIG. 2 illustrates an example overview of a second telecommunications network 200 configured to optimize nodes in order to reduce radio operation during lower and/or non-traffic times. As illustrated in FIG. 2, and similar to FIG. 1, the node 102a within the cell 104a may be connected to multiple UEs, such as the UE 106a located within the cell 104a.

The telecommunications network 200 may operate the same or similar to the telecommunications network 100. For example, the node 102a within the telecommunications network 200 may operate using multiple frequency bands and/or channels when providing services to the UEs 106a. The node 102a may be configured to periodically (e.g., every 15 minutes, 5 minutes, 1 minute, etc.) send raw data 108 associated with the cell 104a to a database 202.

The database 202 may be separate from the OSS 110, as described in FIG. 1, or may be part of the OSS 110. The database 202 may store the raw data 108 and provide the raw data 108 to the ANO server 112. The ANO server 112 may access the raw data 108 and determine a traffic level associated with the node 102a, such as, by determining an average number of active UEs over a time period, an average number of attached UEs over a time period, an average number of allocated PRBs per UE over a time period, a traffic level indication per frequency band, a traffic level indication per channel, and/or a traffic level indication per site.

The ANO server 112 may use the raw data 108 that is stored in the database 202 to identify frequency bands and/or channels to activate and/or deactivate, as discussed in FIG. 1. Once the ANO server 112 identifies the frequency bands and/or channels to activate and/or deactivate, the ANO server 112 may send a transmission to the database 202 including configuration settings 114 for re-configuring operational settings associated the node 102a and/or the cell 104a. In some cases, a self-organizing-network (SON) 204 component may access the database 202 and may send the configuration settings 114 to the node 102a. The configuration settings 114 may cause the node 102a to activate and/or deactivate (or reduce power to) a single frequency band and/or channel or multiple frequency bands and/or channels.

In some cases, the SON 204 may determine to override decisions and/or instructions generated by the ANO server 112. For example, special events (e.g., weather related events (e.g., earthquake, flooding, etc. hurricane) social events, etc.) may require that the telecommunications network 200 be operating at full capacity, regardless of what information is included in the raw data 108. In these cases, even if the raw data indicates that one or more nodes are operating at a greater traffic capacity than a determined traffic level, the SON 204 may override a decision by the ANO server 112 to deactivate one or more frequency bands. In some cases, the SON 204 cause the ANO server 112 to determine which frequency bands to activate and/or deactivate during certain time frames. For example, the SON 204 may schedule the ANO server 112 to operate during periods of time based on historical data that indicates when the telecommunications network 200 is operating in-efficiently.

In various implementations, the SON 204 may be a management plane for receiving configuration settings (e.g., configuration settings 114) from the ANO server 112, via the database 202, and updating configurations of the nodes (e.g., node 102a) in response. In the context of FIG. 2, the SON 204 may receive some or all of the information stored in the database 202, as well as other information tracked by the ANO server 112. Based on such received information, the SON 204 may provide configuration settings to multiple nodes within a telecommunications network.

Figure 3:
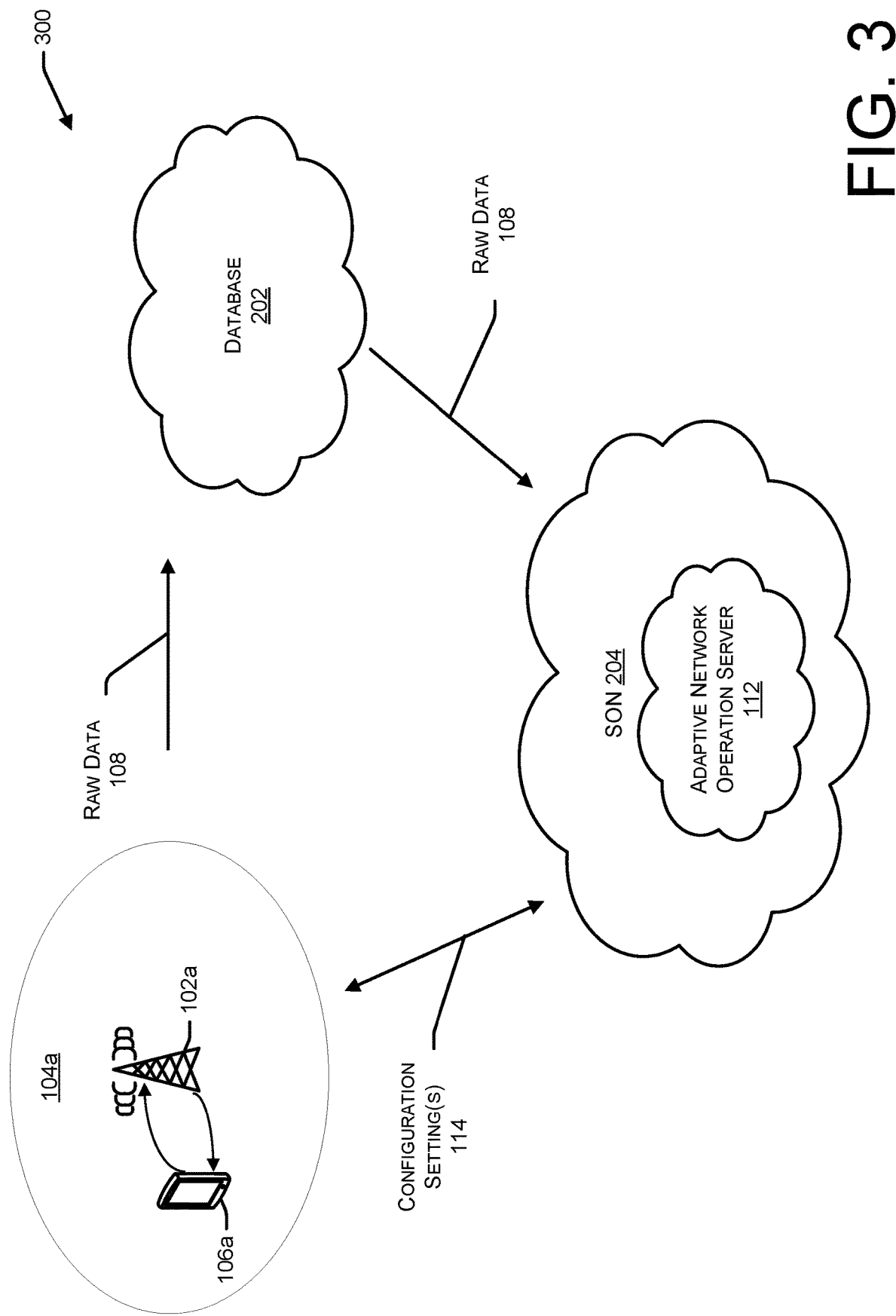
FIG. 3 illustrates an example overview of a third telecommunications network configured to activate and/or deactivate frequency bands and/or channels based on traffic data.

FIG. 3 illustrates an example overview of a third telecommunications network 300 configured to optimize nodes in order to reduce radio operation during lower and/or non-traffic times. As illustrated in FIG. 3, and similar to FIG. 1, the node 102a within the cell 104a may be connected to multiple UEs, such as the UE 106a located within the cell 104a.

The telecommunications network 300 may operate the same or similar to the telecommunications network 100. For example, the node 102a within the telecommunications network 200 may operate using multiple frequency bands and/or channels when providing services to the UEs 106a. The node 102a may be configured to periodically (e.g., every 15 minutes, 5 minutes, 1 minute, etc.) send raw data 108 associated with the cell 104a to a database 202.

The database 202 may be separate from the OSS 110, as described in FIG. 1, or may be part of the OSS 110. The database 202 may store the raw data 108 and provide the raw data 108 to the ANO server 112. The ANO server 112 may be embedded in the SON 204 and may access the raw data 108 and determine a traffic level associated with the node 102a, such as, by determining an average number of active UEs over a time period, an average number of attached UEs over a time period, an average number of allocated PRBs per UE over a time period, a traffic level indication per frequency band, a traffic level indication per channel, and/or a traffic level indication per site.

The ANO server 112 may use the raw data 108 that is stored in the database 202 to identify frequency bands and/or channels to activate and/or deactivate, as discussed in FIG. 1. Once the ANO server 112 identifies the frequency bands and/or channels to activate and/or deactivate, the SON 204 may send the configuration settings 114 to the node 102a. The configuration settings 114 may cause the node 102a to activate and/or deactivate (or reduce power to) a single frequency band and/or channel or multiple frequency bands and/or channels.

Figure 4:
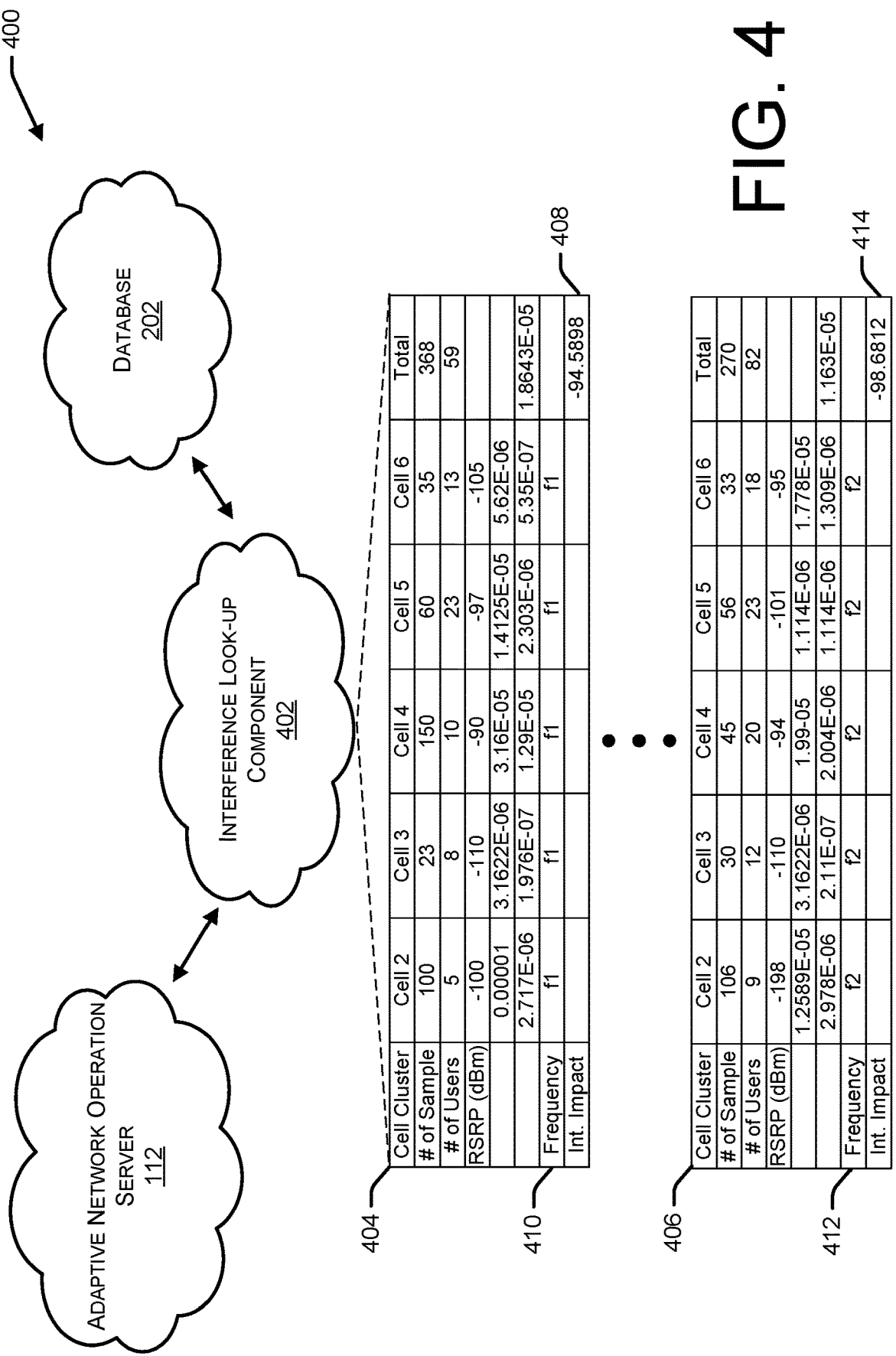
FIG. 4 illustrates an example overview of a fourth telecommunications network configured to activate and/or deactivate frequency bands and/or channels based on traffic data.

FIG. 4 illustrates an example overview of a fourth telecommunications network 400 configured to optimize nodes in order to reduce radio operation during lower and/or non-traffic times via the ANO server 112, the database 202, and an interference look-up component 402.

The telecommunications network 400 may operate the same or similar to the telecommunications network 100. For example, a node, such as the node 102a, within the telecommunications network 400 may operate using multiple frequency bands and/or channels when providing services to UEs, such as the UEs 106a. The node may be configured to periodically (e.g., every 15 minutes, 5 minutes, 1 minute, etc.) send raw data, such as raw data 108 associated with the node to the database 202.

The database 202 may be separate from the OSS 110, as described in FIG. 1, or may be part of the OSS 110. The database 202 may store the raw data and provide the raw data to the ANO server 112. The ANO server 112 may access the raw data and determine a traffic level associated with the node, such as, by determining an average number of active UEs over a time period, an average number of attached UEs over a time period, an average number of allocated PRBs per UE over a time period, a traffic level indication per frequency band, a traffic level indication per channel, and/or a traffic level indication per site.

The ANO server 112 may generate a list of candidate frequency bands and/or channels to deactivate and/or activate based on the determined traffic levels associated with the frequency bands and/or channels and the determined traffic handling capacities associated with the frequency bands and/or channels. Once the list of candidate frequency bands and/or channels is generated, the ANO server 112 may perform an interference impact analysis to determine an interference impact associated with each frequency band and/or channel relative to another node and/or cell.

For example, the ANO server 112 may access the interference look-up component 402 to determine an interference impact associated with each frequency band and/or channel of the nodes with respect to other nodes and/or cells. As illustrated in FIG. 4, the interference look-up component 402 may store a number of tables, such as tables 404 and 406, that include an interference impact value, such as interference impact value 408, indicating an interference impact of a given frequency band and/or channel, such as a first frequency 410 (i.e., f1) of a particular node.

The interference look-up component 402 may access the database 202 to receive raw data associated with the node as well as other nodes and/or cells in order to populate the tables 404 and 406. For example, the ANO server 112 may access the table 404, via the interference look-up component 402, in order to determine the interference impact value 408 of the first frequency 410. The interference impact value 408 may indicate an overall interference impact on a given system, as opposed to with respect to a single other cell. For example, the table 404 includes raw data (e.g., number of samples, number of users, Reference Signal Receive Power (RSRP), etc.) associated with a number of cells (e.g., Cell 2, Cell 3, Cell 4, Cell 5, and Cell 6) in which the first frequency 410 has an interference impact. The ANO server 112 may rank the list of candidate frequency bands and/or channels based on minimizing the interference within the telecommunication network. For example, when ranking the list of candidate frequency bands and/or channels, such as the first frequency 410 and a second frequency 412 (i.e., f2), the ANO server 112 may compare the interference impact values, such as interference impact value 408 and the interference impact value 414, of each frequency band and/or channel in order to determine the overall interference impact that activating and/or deactivating the frequency band and/or channel would have on a given system, such as the telecommunications network 400.

In some cases, the interference look-up component 402 may obtain data, or otherwise generate data, based on information received from crowdsourcing. For example, the crowd-sourced data may be collected from various applications installed at user devices (e.g., UE 106a and UE 106b). These applications in user devices may be installed/managed by network service providers or be downloaded by users from other third-party vendors such as OpenSignal/Ookla applications. The collected data samples may include network serving node ID, RSRP levels from the serving node, location, time stamps, IMEI, network technology such as LTE/Wi-Fi, frequency band or channel, and so on. In a telecommunication network, each cell or node, such as nodes 102a/102b and/or cells 104a/104b, may have its own dominated service area within which its average RSRP level observed among user devices may be stronger than those RSRP levels from other cells or nodes. In such case, the serving node is considered as the best server in the dominated service area. However, due to frequency re-use, coverage overlapping or propagation environments, one node or cell may leak radio signal or so-called interference into service areas dominated by other cells or nodes. For example, some user devices in an area served by one node may receive stronger RSRP levels from other node/cells nearby. The crowd-sourced data samples collected from user devices may be used to build a look-up table for every node to determine their overall interference impact to its surrounding cells/node, such as the interference look-up component 402.

Example Operations

Figure 5:
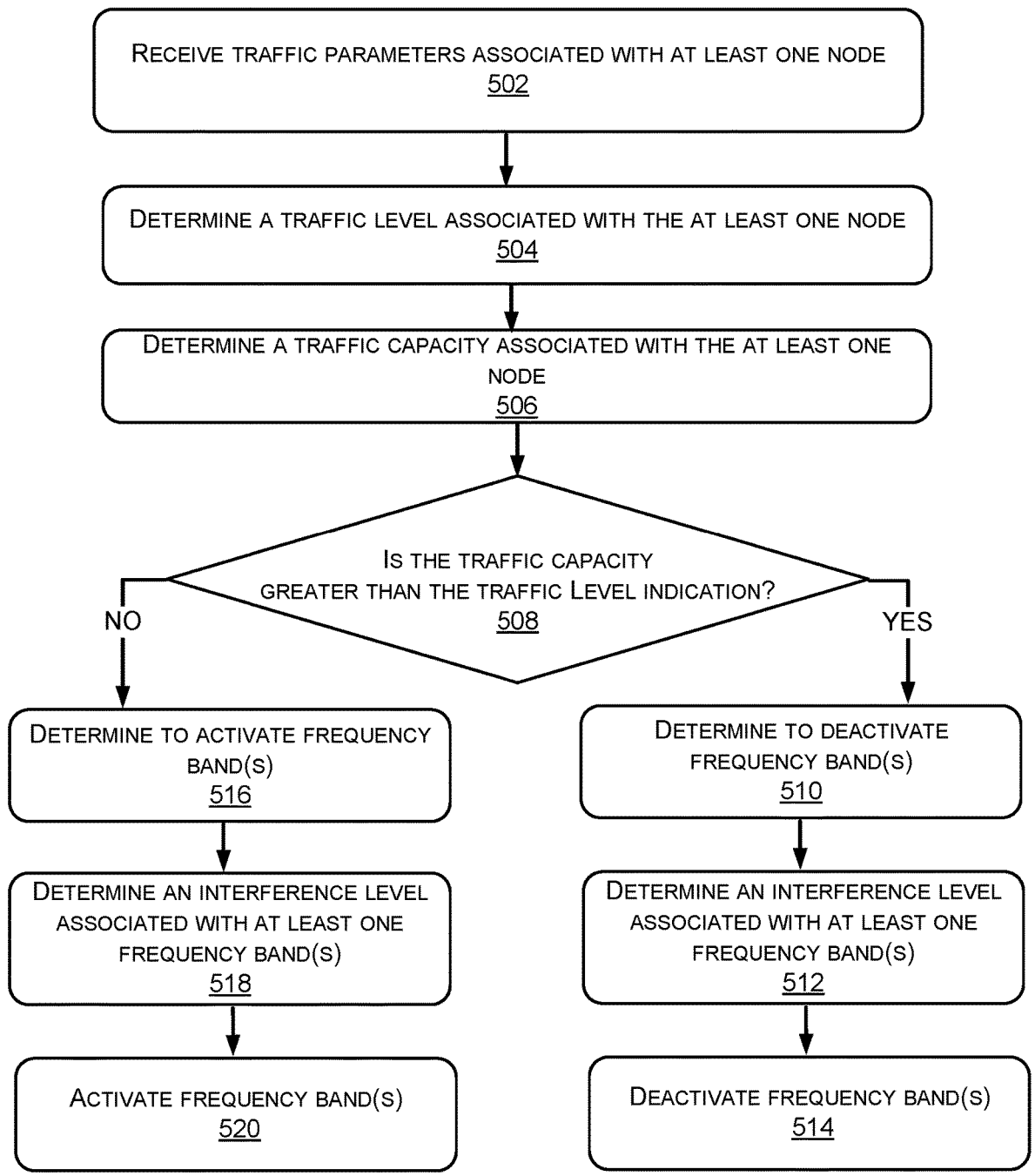
FIG. 5 illustrates an example process for activating and/or deactivating frequency bands and/or channels based on traffic data.

FIG. 5 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 5 illustrates an example process for optimizing nodes in order to reduce unnecessary radio operation during lower and/or non-traffic times. As illustrated at 502, an ANO server may receive traffic parameters associated with at least one node. For example, the nodes 102a and 102b within the telecommunications network 100 may operate using multiple frequency bands and/or channels when providing services to the UEs 106a and 106b. The nodes 102a and 102b may be configured to periodically (e.g., every 15 minutes, 5 minutes, 1 minute, etc.) send raw data 108 associated with the cells 104a and 104b to an operational support system (OSS) 110. The raw data 108 may include real traffic information and/or stats collected via various counters embodied in nodes 102a and 102b associated with the cells 104a and 104b, such as how many UEs (e.g., UEs 106a and 106b) are operating on a particular frequency band and/or channel associated with the nodes 102a and 102b, how many UEs are attached to a particular frequency band and/or channel associated with the nodes 102a and 102b, a number of allocated Physical Resource Blocks (PRBs) per UE, and/or a total data volume associated with the nodes 102a and 102b. The OSS 110 may store the raw data 108 in a data storage device and/or provide the raw data to an adaptive network operation (ANO) server 112.

At 504, the ANO server may determine a traffic level associated with the at least one node. For example, the ANO server 112 may access the raw data 108 and determine a traffic level associated with the nodes 102a and 102b, such as, by determining an average number of active UEs over a time period, an average number of attached UEs over a time period, an average number of allocated PRBs per UE over a time period, a traffic level indication per frequency band, a traffic level indication per channel, and/or a traffic level indication per site (e.g., at the nodes 102a and 102b and/or the cells 104a and 104b).

At 506, the ANO server may determine a traffic capacity associated with the at least one node. For example, the ANO server 112 may access the raw data 108 and determine a traffic capacity associated with the nodes 102a and 102b, such as, by determining which band or channel is in operation, how many PRBs each band or channel provides, an average number of expected PRBs per UE over a time period, a traffic capacity indication per frequency band, a traffic capacity indication per channel, and/or a traffic capacity indication per site (e.g., at the nodes 102a and 102b and/or the cells 104a and 104b).

At 508, the ANO server may determine if the traffic capacity is greater than the traffic level indication. For example, the ANO server 112 may determine if the traffic capacity is greater than the traffic level indication by a certain of amount and/or margin. In some cases, the margin may be determined by a determined traffic level variation parameter (i.e., the standard deviation of traffic level) associated with at least one of the frequency band, the channel, the node, or the site.

At 510, in response to the traffic capacity being greater than the traffic level indication, the ANO server may determine to deactivate frequency bands. For example, if the traffic level associated with frequency band and/or channel is less than the determined traffic handling capacity of the frequency band and/or channel, then the ANO server 112 may determine that the frequency band and/or channel can be deactivated and/or reduced in power.

At 512, the ANO server may determine an interference level associated with at least one frequency band(s). For example, the ANO server 112 may generate a list of candidate frequency bands and/or channels to deactivate and/or activate based on the determined traffic levels associated with the frequency bands and/or channels and the determined traffic handling capacities associated with the frequency bands and/or channels. Once the list of candidate frequency bands and/or channels is generated, the ANO server 112 may perform an interference impact analysis to determine an interference impact associated with each frequency band and/or channel relative to another node and/or cell.

For example, the ANO server 112 may access interreference tables associated with each frequency band and/or channel and may rank the list of candidate frequency bands and/or channels based on the information stored in the interreference table. The ANO server 112 may rank the list of candidate frequency bands and/or channels based on minimizing the interference within the telecommunication network. For example, a first frequency band and a second frequency band being used by one of the nodes 102a or 102b may both be determined to be operating with more traffic handling capacity than their respective associated traffic level, and thus, be candidates to be deactivated and/or reduced in power. The ANO server 112 may access a first interreference table associated with the first frequency band to determine a first interference impact associated with the first frequency band and the ANO server 112 may access a second interreference table associated with the second frequency band to determine a second interference impact associated with the second frequency band.

At 514, the ANO server may deactivate the at least one frequency band(s). For example, the ANO server 112 may compare the first interference impact associated with the first frequency band to the second interference impact associated with the second frequency band to determine which frequency band should be deactivated in order to reduce the amount of interference within the telecommunications network 100. Once the ANO server 112 identifies the frequency bands and/or channels to activate and/or deactivate, the ANO server 112 may send a transmission to the OSS 110 and/or a database associated with the OSS 110 including configuration settings 114 for re-configuring operational settings associated the respective node 102*a* and/or 102*b* and/or the cell 104*a* and/or 104*b*. In some cases, the configuration setting 114 may be sent directly from the ANO server 112 to the nodes 102*a* and 102*b*

At 516, in response to the traffic capacity being less than the traffic level indication, the ANO server may determine to activate frequency bands. In some cases, the traffic level indication may be near or close to the traffic capacity, or the traffic capacity may be less than the traffic level indication within a margin or within a predetermined threshold amount. For example, the ANO server 112 may determine that a first frequency band and a second frequency band, which may have both been deactivated previously during lower and/or non-traffic time of the nodes 102*a* and 102*b*, may both be determined to be candidates to be activated and/or increased in power based on a traffic level being greater than the determined traffic handling capacity of an operating frequency band and/or channel.

At 518, the ANO server may determine an interference level associated with at least one frequency band(s). For example, the ANO server 112 may access a first interference table associated with the first frequency band to determine a first interference impact associated with the first frequency band and the ANO server 112 may access a second inter-reference table associated with the second frequency band to determine a second interference impact associated with the second frequency band. The ANO server 112 may compare the first interference impact associated with the first frequency band to the second interference impact associated with the second frequency band to determine which frequency band should be activated in order to reduce and/or otherwise minimize the amount of interference within the telecommunications network 100.

At 520, the ANO server may activate the at least one frequency band(s). For example, once the ANO server 112 identifies the frequency bands and/or channels to activate and/or deactivate, the ANO server 112 may send a transmission to the OSS 110 and/or a database associated with the OSS 110 including configuration settings 114 for re-configuring operational settings associated the respective node 102*a* and/or 102*b* and/or the cell 104*a* and/or 104*b*. In some cases, the configuration setting 114 may be sent directly from the ANO server 112 to the nodes 102*a* and 102*b*.

Example Architectures

Figure 6:
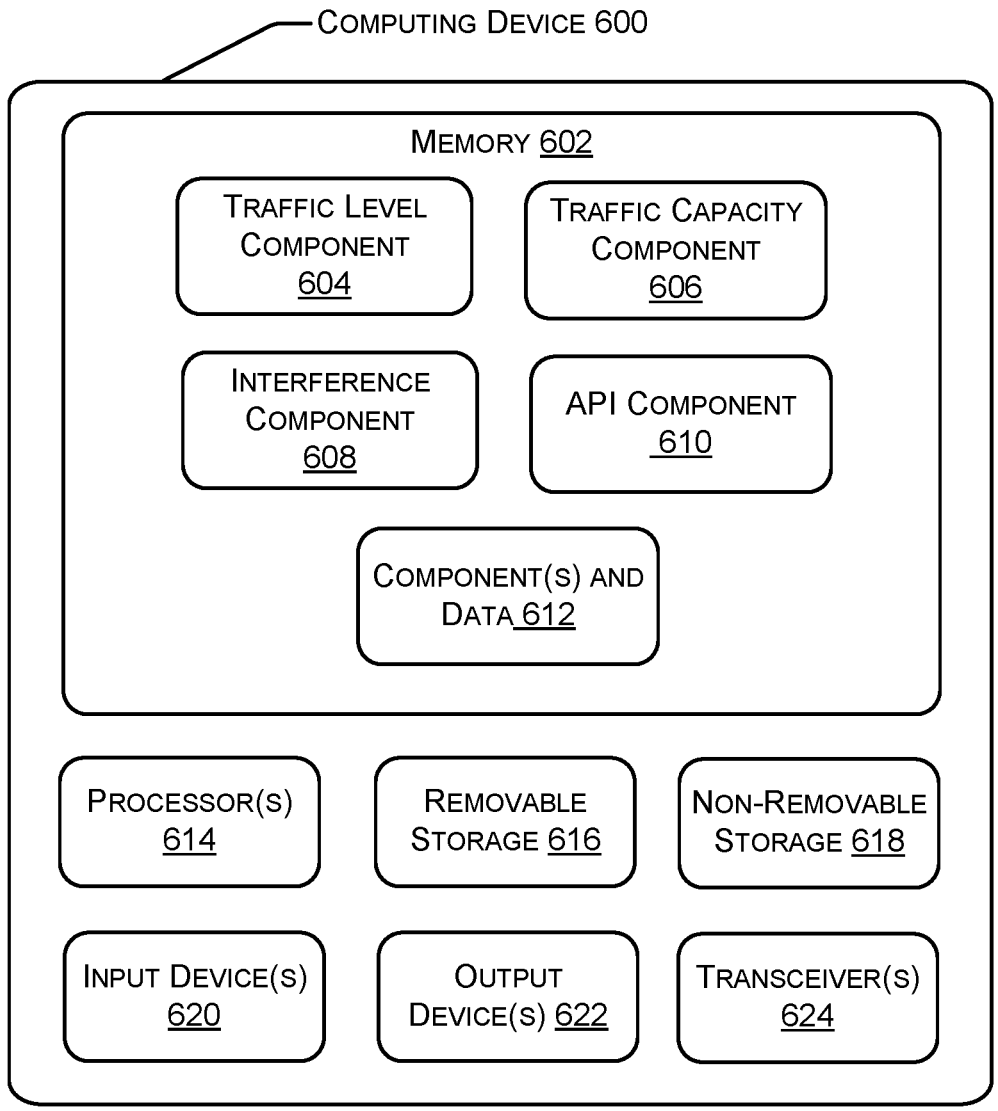
FIG. 6 illustrates an example architecture of a computing device of an adaptive network operation server configured to receive traffic data and to provide, in return, configuration settings.

FIG. 6 illustrates an example architecture of a computing device 600 of an ANO server configured to receive raw data associated with one or more nodes and to provide, in return, configuration settings to the one or more nodes. The ANO server may be an example of the ANO server 112, which is described further herein. The computing device 600 can have a system memory 602. The system memory 602 can store a traffic level component 604, a traffic capacity component 606, an interference component 608, an API component 610, and/or other components and data 612. The computing device 600 can also include processor(s) 614, removable storage 616, non-removable storage 618, input device(s) 620, output device(s) 622, and transceiver(s) 624.

In various examples, system memory 602 can be volatile (such as random-access memory (RAM)), non-volatile (such as read-only memory (ROM), flash memory, etc.), or some combination of the two. Example system memory 602 can include one or more of RAM, ROM, electronically erasable programmable ROM (EEPROM), a Flash Memory, a hard drive, a memory card, an optical storage, a magnetic cassette, a magnetic tape, a magnetic disk storage or another magnetic storage devices, or any other medium.

Examples of the traffic level component 604, the traffic capacity component 606, the interference component 608, and the API component 610 are described above in detail with reference to FIG. 1.

The other components and data 612 can be utilized by the computing device 600 to perform or enable performing any action taken by the computing device 600. The other components and data 612 can include a platform and applications, and data utilized by the platform and applications.

In some embodiments, the processor(s) 614 can be a central processing unit (CPU), a graphics processing unit (GPU), both CPU and GPU, or other processing unit or component known in the art.

The computing device 600 can also include additional data storage devices (removable and/or non-removable) such as, for example, magnetic disks, optical disks, or tape. Such additional storage is illustrated in FIG. 6 by removable storage 616 and non-removable storage 618. Non-transitory computer-readable media may include volatile and nonvolatile, removable and non-removable media implemented in any method or technology for storage of information, such as computer readable instructions, data structures, program modules, or other data. System memory 602, removable storage 616 and non-removable storage 618 are all examples of non-transitory computer-readable media. Non-transitory computer-readable media include, but are not limited to, RAM, ROM, EEPROM, flash memory or other memory technology, compact disc-ROM (CD-ROM), digital versatile discs (DVD) or other optical storage, magnetic cassettes, magnetic tape, magnetic disk storage or other magnetic storage devices, or any other medium which can be used to store the desired information and which can be accessed by the computing device 600. Any such computer-readable storage media can be part of the computing device 600. In various examples, any or all of system memory 602, removable storage 616, and non-removable storage 618, store programming instructions which, when executed, implement some or all of the above-described operations of the computing device 600.

In some examples, the computing device 600 can also have input device(s) 620, such as a keyboard, a mouse, a touch-sensitive display, voice input device, etc., and/or output device(s) 622 such as a display, speakers, a printer, etc. These devices are well known in the art and need not be discussed at length here.

The computing device 600 can also include one or more transceivers, such as a New Radio (NR) transceiver or a Long-Term Evolution (LTE) transceiver to facilitate communication with other devices, such as one or more UEs 106.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
receiving traffic parameters associated with at least one node;
determining a traffic level associated with the at least one node;
determining a traffic capacity associated with the at least one node;
determining for a plurality of frequency bands operated on the at least one node that the traffic level is greater than the traffic capacity;
determining an interference level associated with each frequency band of the plurality of frequency bands; and
activating at least one frequency band of the plurality of frequency bands based at least in part on the traffic level and the interference level associated with the plurality of frequency bands, wherein the interference level associated with each frequency band of the plurality of frequency bands is determined based at least in part on interference tables generated for each frequency band of the plurality of frequency bands, the interference tables including at least a number of samples value, a number of users value, and a Reference Signal Receive Power (RSRP) value for multiple measured cells effected by each frequency band of the plurality of frequency bands.

2. The method of claim 1, wherein the at least one frequency band is a first frequency band of multiple frequency bands operated on the at least one node.

3. The method of claim 2, further comprising generating a list of the multiple frequency bands as potential bands to activate or deactivate.

4. The method of claim 3, further comprising ranking each of the multiple frequency bands in the list of the multiple frequency bands based at least in part on an interference level associated with each of the multiple frequency bands.

5. The method of claim 1, wherein at least a portion of information included in the interference tables is obtained via crowdsourcing from at least one application installed on a user device.

6. The method of claim 1, further comprising sending an instruction to activate the at least one frequency band to a database, wherein a self-organizing network component accesses the database and causes the at least one node to activate the at least one frequency band based at least in part on the instruction stored in the database.

7. The method of claim 1, further comprising sending a transmission to a user device that is in communication with the at least one node, the transmission indicating that the at least one node is operating in a reduced power mode.

8. A computing device comprising:
a processor; and
a memory storing instructions executed by the processor to perform operations including:
receiving traffic parameters associated with at least one node;
determining a traffic level associated with the at least one node;
determining a traffic capacity associated with the at least one node;
determining for a plurality of frequency bands operated on the at least one node that the traffic level is greater than the traffic capacity;
determining an interference level associated with each frequency band of the plurality of frequency bands; and
activating at least one frequency band of the plurality of frequency bands based at least in part on the traffic level and the interference level associated with the plurality of frequency bands, wherein the interference level associated with each frequency band of the plurality of frequency bands is determined based at least in part on interference tables generated for each frequency band of the plurality of frequency bands, the interference tables including at least a number of samples value, a number of users value, and a Reference Signal Receive Power (RSRP) value for multiple measured cells effected by each frequency band of the plurality of frequency bands.

9. The computing device of claim 8, wherein the at least one frequency band is a first frequency band of multiple frequency bands operated on the at least one node.

10. The computing device of claim 9, further comprising generating a list of the multiple frequency bands as potential bands to activate or deactivate.

11. The computing device of claim 10, further comprising ranking each of the multiple frequency bands on the list of the multiple frequency bands based at least in part on an interference level associated with each of the multiple frequency bands.

12. The computing device of claim 11, wherein at least a portion of information included in the interference tables is obtained via crowdsourcing from at least one application installed on a user device and the at least one application is installed by a network provider associated with the user device.

13. The computing device of claim 8, further comprising sending an instruction to activate the at least one frequency band to a database, wherein a self-organizing network component accesses the database and causes the at least one node to activate the at least one frequency band based at least in part on the instruction stored in the database.

14. The computing device of claim 8, further comprising sending a transmission to a user device that is in communication with the at least one node, the transmission indicating that the at least one node is operating in a reduced power mode.

15. A system including a computing device comprising:
a processor; and
a memory storing instructions executed by the processor to perform operations including:
receiving traffic parameters associated with at least one node;
determining a traffic level associated with the at least one node;
determining a traffic capacity associated with the at least one node;
determining for a plurality of frequency bands operated on the at least one node that the traffic level is greater than the traffic capacity;
determining an interference level associated with each frequency band of the plurality of frequency bands; and
activating at least one frequency band of the plurality of frequency bands based at least in part on the traffic level and the interference level associated with the plurality of frequency bands, wherein the interference level associated with each frequency band of the plurality of frequency bands is determined based at least in part on interference tables generated for each frequency band of the plurality of frequency bands, the interference tables including at least a number of samples value, a number of users value, and a Reference Signal Receive Power (RSRP) value for multiple measured cells effected by each frequency band of the plurality of frequency bands.

16. The system of claim 15, wherein the at least one frequency band is a first frequency band of multiple frequency bands operated on the at least one node.

17. The system of claim 16, further comprising generating a list of the multiple frequency bands as potential bands to activate or deactivate.

18. The system of claim 15, wherein the traffic parameters include raw active user data and determining the traffic capacity associated with the at least one node includes determining an average number of users associated with a peak time of access.

19. The system of claim 15, further comprising sending a transmission to a user device that is in communication with the at least one node, the transmission indicating that the at least one node is operating in a reduced power mode.

20. The system of claim 19, wherein the transmission causes the user device to display an icon indicating that the at least one node is operating in a reduced power mode.

\* \* \* \* \*